Feb. 3, 1942.     O. J. McCULLOUGH     2,271,742
CABLE MEASURING DEVICE
Filed Aug. 18, 1939
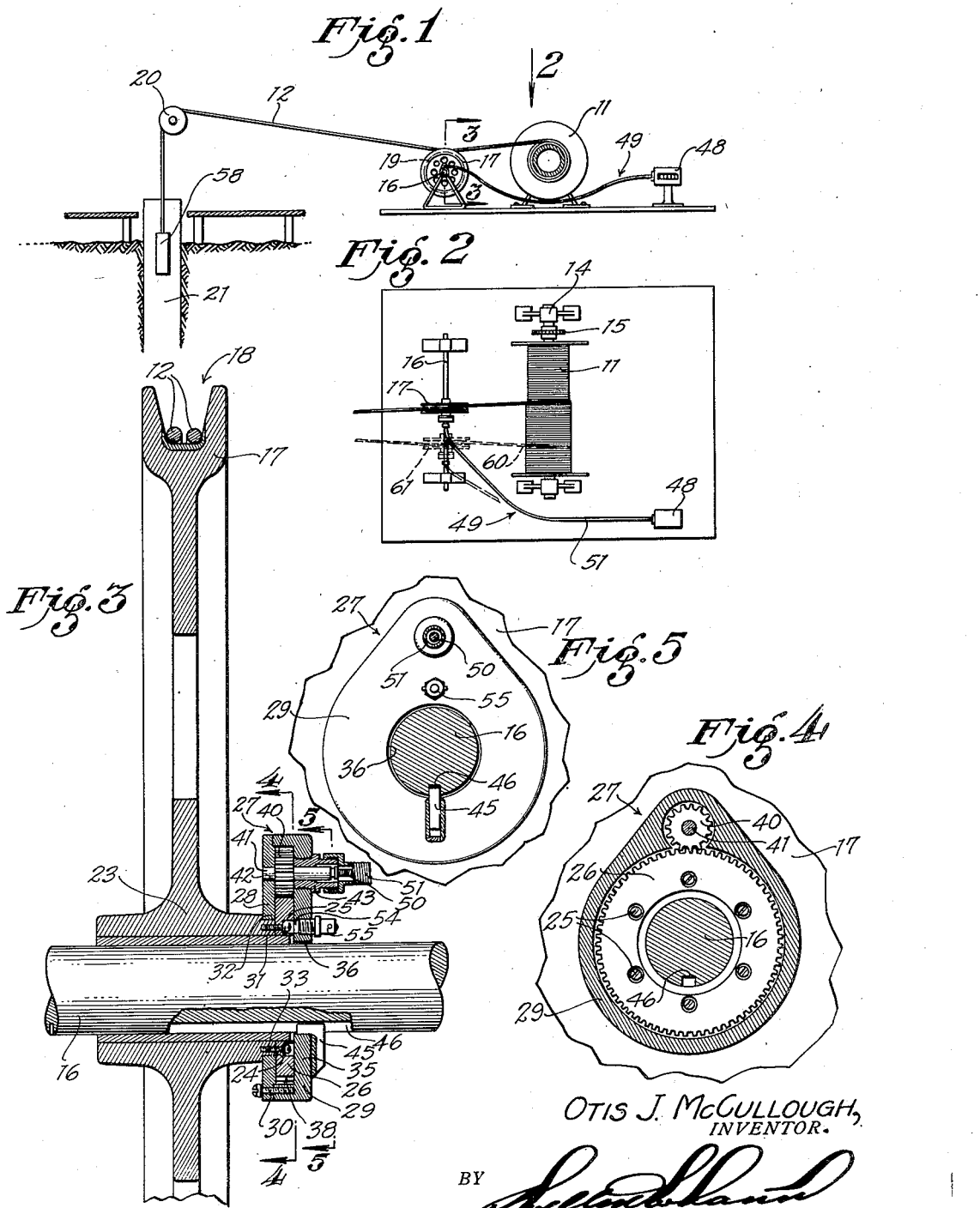
Otis J. McCullough,
INVENTOR.
BY
ATTORNEY Patented Feb. 3, 1942

2,271,742

UNITED STATES PATENT OFFICE 2,271,742

CABLE MEASURING DEVICE

Otis J. McCullough, Houston, Tex.

Application August 18, 1939, Serial No. 290,836

3 Claims. (Cl. 33—126.5)

My invention relates to a cable measuring device for measuring cable as it is wound from and wound onto a cable drum.

My invention is of utility in various industries but has a marked utility in the oil well art wherein it is common practice to lower tools or devices into an oil well by means of a cable. Certain operations which must be performed in the oil well require that the operator know the exact position of the tool or device in the well, hence it is necessary to have a measuring device which will have an optimum of accuracy. It will be recognized that a small error for measuring short distances in a small amount of cable might not be serious, but such small error accumulates over a long amount of cable and becomes serious jeopardy to the performance of the work to be done by the tool or device lowered into the well by the cable.

It is an object of my invention to provide a cable measuring device having optimum of accuracy, and which will accurately measure long lengths of cable being wound from or onto a cable drum.

It is common practice to wind a cable in layers on a cable drum, and the cable at the point where it extends from the drum travels back and forth during the winding or unwinding operation from one end of the drum to the other end thereof.

It is an object of my invention to provide a cable measuring device having a sheave over which the cable is extended as it leaves the drum, which sheave is free to move axially in order to follow the cable as it moves back and forth during the winding or unwinding operation.

It is a further object of my invention to provide a cable measuring device having a sheave rotatably and axially movable on a shaft and a gear box in which gears are placed mounted on the sheave and shaft, the gear box being so arranged that it is rotatable but not axially movable relative to the sheave and is axially movable but not rotatable relative to the shaft.

It is a further object of my invention to provide a simple and sturdy structure having a minimum number of rugged parts which will have long life.

Other objects and advantages of my invention will be made evident during the following detailed description of a preferred embodiment of my invention. I recognize that the principle of my invention may be embodied in other forms, and I therefore do not wish to be limited to the details of construction which form a part of the preferred form of my invention, but wish my invention to be broadly construed in accordance with the appended claims.

Referring to the accompanying drawing in which the preferred form of my invention is illustrated:

Fig. 1 is a diagrammatic view in elevation which shows an apparatus incorporating the features of my invention.

Fig. 2 is also a diagrammatic view taken in plan as illustrated by the arrow 2 of Fig. 1.

Fig. 3 is a fragmentary sectional view through the sheave, gear box, and associated parts, this view being taken on the line 3—3 of Fig. 1.

Fig. 4 is a sectional view taken on the line 4—4 of Fig. 3.

Fig. 5 is a fragmentary sectional view taken on the line 5—5 of Fig. 3.

Referring to the drawing in detail, the numeral 11 represents a cable drum on which a cable 12 may be wound. This cable 12 is representative of any lineal movable member, such as a steel cable, hemp rope, a tape, or other member. The drum 11 is supported by bearing support means 14 and may be rotated, through the medium of a sprocket 15, by suitable drive means, not shown. Placed adjacent the drum 11 is a shaft 16 which is preferably arranged with its axis parallel to the axis of rotation of the drum 11. Placed on the shaft 16 is a cable engaging member or sheave 17 which is not only rotatable on the shaft, but is also axially movable therealong. This sheave 17 is provided with a peripheral cable receiving groove 18 which is preferably made sufficiently wide so that the cable may be wound a complete revolution on the sheave, as illustrated by dotted lines 19 in Fig. 1. The purpose of this is to provide maximum lineal contact between the sheave and cable in order to prevent slippage between these two parts. The cable 12 extends from the sheave 17 over a small sheave 20 and from the small sheave 20 extends downwardly into the well 21 having a tool or other device connected to the lower end thereof.

Referring more particularly to Figs. 3 to 5 inclusive, I shall describe the details of construction of the sheave and gear box assembly. The sheave 17 has a hub 23 which surrounds the shaft 16. Secured to an end face 24 of the hub 23 by suitable screws 25 is a drive gear 26. This drive gear 26 when secured in place by the screws 25 constitutes an integral part of the sheave 17. Surrounding the gear 26 is a gear box or housing 27 which includes an inner part 28 and an outer cup shaped part 29, these two parts being secured together by suitable screws 30.

The end of the hub 23 adjacent the drive gear 26 is reduced in size to form a reduced end 31 and cooperates with the drive gear 26 to provide an annular channel 32. The inner part 28 of the gear box 27 has a cylindrical opening 33 and extends into the channel 32 as illustrated, the walls of the channel and of the adjacent side of the drive gear 26 having a running fit with the part 28 in order that the sheave 17 may be rotatable relative to the gear box 27 but not axially movable relative thereto.

The outer part 29 has a radial wall 35 having an opening 36 through which the shaft 16 extends. The gear box 27 provides a gear chamber 38 in which the drive gear 26 is enclosed and also in which a driven gear or pinion 40 is enclosed. This pinion 40 is mounted on a driven shaft 41 which journals in the opening 42 of the part 28 and in the bushing member 43 which is threadedly connected to the radial wall of the outer part 29. The drive gear 26 meshes with the driven gear 40 driving the same and causing the shaft 41 to rotate.

The gear box 27 is restrained from rotational movement relative to the shaft 16, but is permitted to move axially of the shaft 16 by means of a key 45 which is secured as by welding to the outer face of the part 29 and extends into an axial keyway 46 formed in the shaft 16. It will therefore be seen that the gear box is rotatable but not axially movable relative to the sheave 17 and is axially movable but not rotatable relative to the shaft 16. It will further be seen, therefore, that when the sheave rotates the drive gear 26 rotates therewith. Due to the fact that the driven gear 40 is supported in the gear box 27 which is non-rotatable, the driven gear will be driven. When the sheave 17 moves axially on the shaft, as will be described shortly, the gear box is moved with the sheave and the drive and driven gears are retained in their proper aligned and meshing relationship.

Mounted in a convenient place is a meter 48 which may be calibrated to give the desired information. In this instance the meter 48 is calibrated to give the lineal movement of the cable 12 to and from the drum. This meter 48 may be of any standard construction available on the market at this time. The meter 48 is driven through a flexible cable means 49 which extends between the meter and the gear case. As shown in Fig. 3, the cable means includes a cable 50 which is drivably connected to the shaft 41 and a flexible cable housing 51 which is connected to the bushing 43.

In assembling the sheave, the gears, and gear housing, the gears are placed in the gear housing, whereafter the gear housing is moved into the position shown in Figs. 3 to 5. At this time the screws 25 are installed in place through an opening 54 which not only acts as a passage through which the screws 25 are moved, but also acts as an opening through which the screw driver may be extended for the purpose of tightening the screws in place. After the parts have been assembled a suitable grease fitting 55 may be placed in the opening 54, thus providing for lubrication.

In using the cable measuring device of my invention the parts are assembled as illustrated. The cable is extended from the drum, wrapped at least one revolution around the sheave 17, extended over the small sheave 20, and connected to a device, such as 58, illustrated in Fig. 1. With the device 58 at the level of the ground, the meter 48 may be set at zero. The drum is then rotated in a direction to feed the cable into the well, thus lowering the device 58. As the cable is unwound it causes the sheave 17 to rotate, and, as explained heretofore, this rotation is transmitted through the gears and cable means to the meter 48. During the unwinding of the cable it will travel back and forth on the drum, such, for example, as from a central position illustrated by full lines in Fig. 2 through the position indicated by dotted lines 60 in Fig. 2 to a position at the extreme end of the drum. The sheave and parts assembled therewith, however, are free to follow the cable and may move into a position indicated by dotted lines 61 in Fig. 2.

In use my invention has proved to be accurate in the measuring of the cable wound from and onto the drum and, due to its free rotational and axial movement which allows it to move with and to follow the cable, the device of my invention produces no wear on the cable or in any way affects its being wound from or onto the drum. The design is simple and rugged and is therefore very practical to use because it requires no repairs over long periods of use.

I claim as my invention:

1. In a device for measuring the movement of a cable which is run from a drum to a member which is operated by the cable, the combination of: a shaft extending substantially parallel to the axis of said drum; a sheave on said shaft around which said cable is wound at least once, said sheave being rotatable on said shaft so as to be rotated upon movement of said cable to or from said drum, and being axially movable so as to be capable of following said cable as it winds or unwinds axially of said drum; a drive gear mounted on said sheave; a gear box enclosing said drive gear and mounted on said sheave to permit rotation of said sheave relative to said gear box; key means cooperating between said gear box and said shaft to restrain said gear box from rotation and to permit same to move with said sheave in a direction axially of said shaft; a driven gear in said gear box and driven by said drive gear; a meter spaced from said gear box; and means whereby said driven gear operates said meter.

2. In a device for measuring the movement of a cable which is run from a drum to a member which is operated by the cable, the combination of: a shaft extending substantially parallel to the axis of said drum; a sheave on said shaft around which said cable is wound at least once, said sheave being rotatable on said shaft so as to be rotated upon movement of said cable to or from said drum, and being axially movable so as to be capable of following said cable as it winds or unwinds axially of said drum; a gear box mounted on the hub of said sheave; a drive gear within said gear box and secured to the end of said hub in such a manner that said sheave may rotate relative to said gear box; key means cooperating between said gear box and said shaft to restrain said gear box from rotation and to permit same to move with said sheave in a direction axially of said shaft; a driven gear in said gear box and driven by said drive gear; a meter spaced from said gear box; and means whereby said driven gear operates said meter.

3. In combination: a shaft; a sheave on said shaft having a cable receiving groove on its periphery, said sheave being rotatably and axially movable on said shaft; a gear box on said sheave and said shaft; means for mounting said gear box on said sheave to prevent relative axial movement therebetween; means for mounting said gear box on said shaft to prevent relative rotational movement therebetween; a drive gear mounted on said sheave in said gear box; a driven gear in said gear box and driven by said drive gear; a meter spaced from said gear box; and means whereby said driven gear operates said meter.

OTIS J. McCULLOUGH.